United States Patent
Minamiura et al.

(10) Patent No.: US 10,086,823 B2
(45) Date of Patent: Oct. 2, 2018

(54) VEHICLE ON WHICH TRAVELING MOTOR IS MOUNTED

(71) Applicant: TOYOTA JIDOSHA KABUSHIKI KAISHA, Toyota-shi, Aichi-ken (JP)

(72) Inventors: Keiichi Minamiura, Nagoya (JP); Hikokazu Akimoto, Nagakute (JP); Yohei Ogawa, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 88 days.

(21) Appl. No.: 15/302,685

(22) PCT Filed: Mar. 10, 2015

(86) PCT No.: PCT/IB2015/000303
§ 371 (c)(1),
(2) Date: Oct. 7, 2016

(87) PCT Pub. No.: WO2015/155582
PCT Pub. Date: Oct. 15, 2015

(65) Prior Publication Data
US 2017/0036665 A1    Feb. 9, 2017

(30) Foreign Application Priority Data

Apr. 9, 2014   (JP) .................................. 2014-080610

(51) Int. Cl.
*B60W 20/13*   (2016.01)
*B60K 6/28*    (2007.10)
(Continued)

(52) U.S. Cl.
CPC ............... *B60W 20/13* (2016.01); *B60K 6/28* (2013.01); *B60K 6/44* (2013.01); *B60L 3/0046* (2013.01);
(Continued)

(58) Field of Classification Search
None
See application file for complete search history.

(56) References Cited

U.S. PATENT DOCUMENTS 6,133,707 A * 10/2000 Kikuchi .................... B60K 6/28
                                                      320/104
2001/0022518 A1* 9/2001 Asakura ............. G01R 31/3679
                                                      324/426

(Continued)

FOREIGN PATENT DOCUMENTS

| EP | 0967108 A1 | 12/1999 |
| JP | 11341691 A | 12/1999 |
| JP | 2008-312282 A | 12/2008 |

*Primary Examiner* — Thomas G Black
*Assistant Examiner* — Demetra R Smith-Stewart
(74) *Attorney, Agent, or Firm* — Sughrue Mion, PLLC

(57) ABSTRACT

After an alkaline secondary battery is determined to be in an over-discharge state, a battery pack is discharged while an electrolytic solution contained in the alkaline secondary battery in the over-discharge state is decomposed so that traveling using power of a motor is performed. The electrolytic solution remains in the alkaline secondary battery even when the alkaline secondary battery is in the over-discharge state. The alkaline secondary battery in the over-discharge state can be discharged and a vehicle can be allowed to travel by decomposing the electrolytic solution. In this manner, a traveling distance available during evacuation traveling of the vehicle can be increased.

3 Claims, 6 Drawing Sheets

(51) Int. Cl.
*B60K 6/44* (2007.10)
*B60W 10/26* (2006.01)
*B60L 3/00* (2006.01)
*B60L 11/18* (2006.01)
*H02J 7/00* (2006.01)
*B60W 10/06* (2006.01)

(52) U.S. Cl.
CPC .......... *B60L 11/1861* (2013.01); *B60W 10/06* (2013.01); *B60W 10/26* (2013.01); *H02J 7/0021* (2013.01); *H02J 7/0029* (2013.01); *H02J 7/0047* (2013.01); *B60W 2510/244* (2013.01); *B60W 2710/244* (2013.01); *B60Y 2200/92* (2013.01); *B60Y 2300/91* (2013.01); *B60Y 2300/92* (2013.01); *H02J 2007/004* (2013.01); *H02J 2007/005* (2013.01); *Y02T 10/705* (2013.01); *Y02T 10/7005* (2013.01); *Y02T 10/7044* (2013.01); *Y02T 10/7055* (2013.01); *Y10S 903/907* (2013.01); *Y10S 903/93* (2013.01)

(56) References Cited

U.S. PATENT DOCUMENTS

| | | | |
|---|---|---|---|
| 2008/0012535 A1* | 1/2008 | Takatsuji | B60L 3/0046 320/150 |
| 2010/0225276 A1* | 9/2010 | Sugiyama | H01M 10/052 320/118 |
| 2010/0253284 A1* | 10/2010 | Aoki | H01M 10/441 320/118 |
| 2012/0109443 A1* | 5/2012 | Takahashi | B60L 1/003 701/22 |
| 2013/0200853 A1 | 8/2013 | Ro | |

* cited by examiner

VEHICLE ON WHICH TRAVELING MOTOR IS MOUNTED

BACKGROUND OF THE INVENTION

1. Field of the Invention

The invention relates to a vehicle that can be allowed to travel by power of a traveling motor by using discharge electric power of an alkaline secondary battery.

2. Description of Related Art

A voltage value of a secondary battery is monitored so that over-discharge of the secondary battery is prevented. When the voltage value of the secondary battery decreases below a voltage value (referred to as an over-discharge voltage value) corresponding to an over-discharge state, the secondary battery is determined to be in the over-discharge state. When the secondary battery is in the over-discharge state, charging and discharging of the secondary battery are not performed.

A vehicle is suddenly stopped if the secondary battery is determined to be in the over-discharge state and the charging and the discharging of the secondary battery are stopped during traveling of the vehicle using discharge electric power of the secondary battery. According to Japanese Patent Application Publication No. 2008-312282 (JP 2008-312282 A), the over-discharge resulting from further discharge in a non-over-discharge state is detected in advance and a discharge current of a battery module is decreased when the detection is performed in view of this point. In other words, discharging of the battery module is limited before the battery module is put into the over-discharge state so that the sudden stop of the vehicle is suppressed.

In JP 2008-312282 A, only discharge control until the battery module reaching the over-discharge state for suppressing the sudden stop of the vehicle is disclosed. Accordingly, charging and the discharging of the battery module are stopped as described above if the battery module is put into the over-discharge state. As a result, the vehicle is stopped.

SUMMARY OF THE INVENTION

It is preferable that the vehicle is allowed to continue traveling as far as possible when evacuation traveling of the vehicle is performed. Even when the secondary battery is in the over-discharge state, an electrolytic solution remains in the secondary battery. In view of the above-mentioned problems and focusing on the electrolytic solution remaining in the secondary battery, the invention provides a vehicle on which a traveling motor (hereinafter, referred to as a "motor generator" or simply as a "motor"), which discharges a secondary battery and ensures traveling of the vehicle even when the secondary battery is in an over-discharge state, is mounted.

According to an aspect of the invention, there is provided a vehicle including a battery pack, a motor, a voltage sensor, and a controller. The battery pack has a plurality of alkaline secondary batteries connected in series. The motor is configured to generate power for traveling of the vehicle by receiving discharge electric power of the battery pack. The voltage sensor is configured to detect a voltage value of each of the alkaline secondary batteries.

The controller is configured to determine whether or not the alkaline secondary battery is in an over-discharge state based on at least the voltage value detected by the voltage sensor or a voltage difference. The voltage difference is a difference between the voltage value and a predetermined reference voltage value. The controller is configured to perform the traveling of the vehicle by using the power of the motor by discharging the battery pack while decomposing an electrolytic solution contained in the alkaline secondary battery in the over-discharge state after the controller determines that the alkaline secondary battery is in the over-discharge state.

In the vehicle described above, the controller may be configured to determine that the alkaline secondary battery is in the over-discharge state when the voltage value is equal to or lower than a predetermined voltage value threshold. In addition, the controller may be configured to determine that the alkaline secondary battery is in the over-discharge state when the voltage value remains equal to or lower than the predetermined voltage value threshold for a predetermined period of time. In addition, in the vehicle described above, the controller may be configured to determine that the alkaline secondary battery is in the over-discharge state when the voltage value becomes equal to or lower than the predetermined voltage value threshold on repeated occasions.

In addition, in the vehicle described above, the controller may be configured to determine that the alkaline secondary battery is in the over-discharge state when the voltage difference is equal to or higher than a predetermined voltage difference threshold. In addition, the controller may be configured to determine that the alkaline secondary battery is in the over-discharge state when the voltage difference remains equal to or higher than the predetermined voltage difference threshold for a predetermined period of time. In addition, the controller may be configured to determine that the alkaline secondary battery is in the over-discharge state when the voltage difference becomes equal to or higher than the predetermined voltage difference threshold on repeated occasions.

In addition, the vehicle described above may further include a warning device configured to inform a driver of the vehicle that the alkaline secondary battery is in the over-discharge state.

The electrolytic solution remains in the alkaline secondary battery even when the alkaline secondary battery is in the over-discharge state. The alkaline secondary battery in the over-discharge state can be discharged by decomposing the electrolytic solution. Although the amount of the electrolytic solution is decreased by the decomposition of the electrolytic solution, the alkaline secondary battery can be discharged until the electrolytic solution disappears.

The traveling using the power of the motor can be performed when the alkaline secondary battery (battery pack) in the over-discharge state is discharged. In this manner, the vehicle can be allowed to continue traveling even after the alkaline secondary battery is determined to be in the over-discharge state. Accordingly, a traveling distance available during evacuation traveling of the vehicle can be increased, compared to a case where the vehicle is stopped when the alkaline secondary battery is put into the over-discharge state, according to the vehicle described above.

In this vehicle, the controller may be configured to decrease an upper limit electric power value while an integrated value is lower than a first threshold when the controller determines that the alkaline secondary battery in the over-discharge state. Here, the upper limit electric power value may be a value which allows the discharging of the battery pack, and the integrated value may be obtained by integrating the current value while performing the discharging for decomposing the electrolytic solution. In this manner, a current value available during the discharging of the battery pack can be decreased, and likelihood of an increase in decrement of the electrolytic solution can be suppressed in the alkaline secondary battery in the over-discharge state. As a result, the length of time during which the alkaline secondary battery in the over-discharge state is discharged can be increased.

When discharging for decomposing the electrolytic solution is performed, the decrement of the electrolytic solution depends on the current value during the discharging. In other words, this current value can be detected by a current sensor mounted on the vehicle. Accordingly, the decrement of the electrolytic solution can be grasped if the current value available when the discharging for decomposing the electrolytic solution is performed is integrated. The traveling using the power of the motor can be performed while the upper limit electric power value is decreased while an integrated value of the current value is lower than a first threshold.

In addition, the vehicle described above may further include an engine, which is configured to generate power for the traveling of the vehicle, mounted on the vehicle. In this case, the vehicle can be allowed to travel by using the power of the engine. If the electrolytic solution excessively decreases, discharge electric power of the alkaline secondary battery in the over-discharge state decreases, and the traveling of the vehicle by using the motor is unlikely to be performed. In the vehicle described above, the controller may be configured to allow the vehicle to travel by using the power of the engine, without using the power of the motor, when the integrated value is equal to or higher than the first threshold. In this case, the vehicle can be allowed to travel by using the power of the engine even if the vehicle cannot be allowed to travel by using the power of the motor. As a result, the traveling distance available during the evacuation traveling of the vehicle can be increased.

In the vehicle described above, the controller may be configured to stop charging and the discharging of the battery pack, and the controller may be configured to stop the engine, when the integrated value is equal to or higher than a second threshold. The second threshold is a value higher than the first threshold. Since the battery pack is discharged while the engine is driven, the amount of the electrolytic solution continues to be decreased by the decomposition of the electrolytic solution in the alkaline secondary battery in the over-discharge state. If the amount of the electrolytic solution continues to be decreased, the battery pack becomes unlikely to be discharged and the driving of the engine becomes impossible. The charging and the discharging of the battery pack is stopped and the engine is stopped when the integrated value is equal to or higher than the second threshold. Then, the vehicle is stopped.

Moreover, the vehicle described above may further include an engine configured to start by receiving the discharge electric power of the battery pack and generate the power for the traveling of the vehicle. In the vehicle provided with the engine as described above, the controller may be configured to decrease the upper limit electric power value within a range equal to or higher than electric power for starting the engine when the integrated value is lower than the first threshold. According to the vehicle described above, the starting of the engine can be ensured by control by the controller, the vehicle can be allowed to travel by using the power of the engine, and the vehicle can be allowed to travel as far as possible.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment as an example of the invention will be described.

Figure 1:
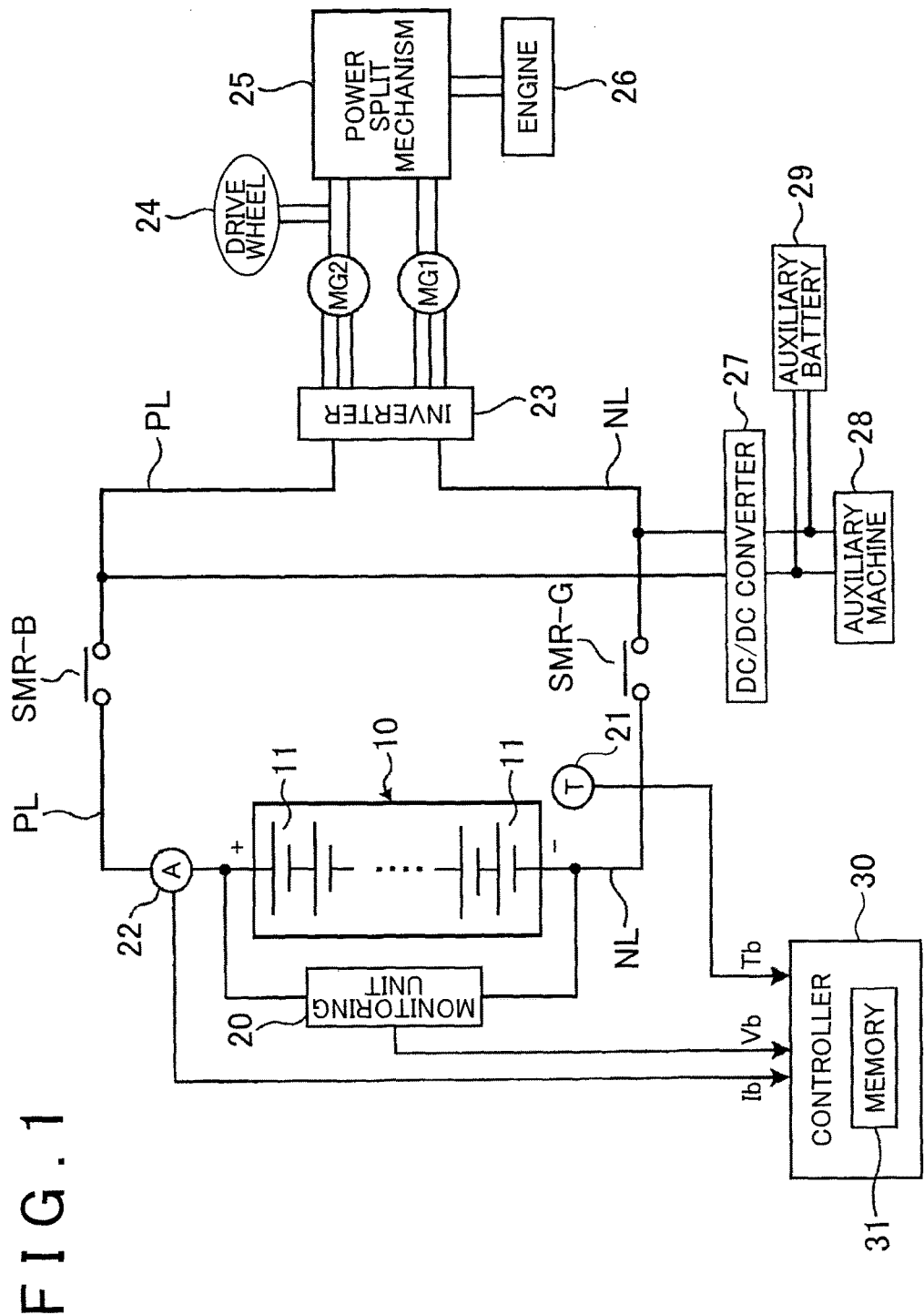
FIG. 1 is a diagram illustrating a configuration of a battery system according to an embodiment of the invention.

FIG. 1 illustrates a configuration of a battery system according to this embodiment. The battery system according to this embodiment is mounted on a vehicle (so-called hybrid car). As described later, this vehicle is capable of traveling while using a battery pack and an engine in combination with each other.

A battery pack 10 has a plurality of single batteries 11 that are connected in series. An alkaline secondary battery such as a nickel-hydrogen battery and a nickel-cadmium battery is used as the single battery (corresponding to the alkaline secondary battery of the invention) 11. As is known, the single battery 11 has an electric power generating element that performs charging and discharging and a battery case that accommodates the electric power generating element. The electric power generating element has a positive electrode plate, a negative electrode plate, and a separator that is arranged between the positive electrode plate and the negative electrode plate. The electrolytic solution is steeped in the separator. The electrolytic solution is present, as a surplus liquid, around the electric power generating element in the battery case.

A battery module (corresponding to the alkaline secondary battery of the invention) can be used instead of the single battery 11. The battery module has a module case that constitutes an exterior of the battery module and a plurality of electric power generating elements that are accommodated in the module case. The plurality of electric power generating elements are connected in series in the module case. A plurality of the battery modules can be connected in series so as to constitute the battery pack 10.

As is known, a valve is disposed in the battery case. The valve discharges a gas that is generated in the battery case out of the battery case. The gas is generated in the battery case as a result of over-charge or over-discharge of the single battery 11. This gas is generated by a chemical reaction of the electrolytic solution or the like. An inner portion of the battery case is in a closed state, and thus pressure (internal pressure) in the battery case rises as a result of the generation of the gas. When the internal pressure of the battery case reaches an operating pressure of the valve, the valve is changed from the closed state to an open state and the gas is discharged out of the battery case.

A monitoring unit (corresponding to a voltage sensor of the invention) 20 detects a voltage value Vb of each of the single batteries 11 and outputs a detection result to a controller 30. When the plurality of the battery modules constitute the battery pack 10 as described above, the monitoring unit 20 detects the voltage value Vb of each of the battery modules and outputs the detection result to the controller 30.

A temperature sensor 21 detects a temperature Tb of the battery pack 10 (single battery 11) and outputs a detection result to the controller 30. A current sensor 22 detects a current value Ib of the battery pack 10 and outputs a detection result to the controller 30. In this embodiment, the current value Ib obtained during discharging of the battery pack 10 is a positive value and the current value Ib obtained during charging of the battery pack 10 is a negative value.

The controller 30 has a memory 31. The memory 31 stores various types of information for the controller 30 to perform a predetermined processing (processing described in this embodiment in particular). Although the memory 31 is built into the controller 30 in this embodiment, the memory 31 can be disposed out of the controller 30.

A positive electrode line PL is connected to a positive electrode terminal of the battery pack 10 and a negative electrode line NL is connected to a negative electrode terminal of the battery pack 10. A system main relay SMR-B is disposed on the positive electrode line PL. A system main relay SMR-G is disposed on the negative electrode line NL. The system main relays SMR-B, SMR-G are switched between ON and OFF by receiving a drive signal from the controller 30.

The battery pack 10 is connected to an inverter 23 via the positive electrode line PL and the negative electrode line NL. When the controller 30 turns ON the system main relays SMR-B, SMR-G, the battery pack 10 and the inverter 23 are connected. Then, the battery system that is illustrated in FIG. 1 is put into a startup state (ready-on).

When an ignition switch is switched from OFF to ON, the controller 30 turns ON the system main relays SMR-B, SMR-G. When the ignition switch is switched from ON to OFF, the controller 30 turns OFF the system main relays SMR-B, SMR-G. Then, the connection between the battery pack 10 and the inverter 23 is blocked and the battery system that is illustrated in FIG. 1 is put into a stop state (ready-off).

The inverter 23 converts direct current electric power (also called as DC electric power) that is output from the battery pack 10 to alternating current electric power and outputs the alternating current electric power to a motor generator MG2. The motor generator (referred to as a traveling motor or simply as a motor) MG2 receives the alternating current electric power that is output from the inverter 23 and generates kinetic energy (power) for vehicle traveling. The vehicle is allowed to travel when the kinetic energy that is generated by the motor generator MG2 is transferred to a drive wheel 24.

A power split mechanism 25 transfers power of an engine 26 to the drive wheel 24 and transfers the power of the engine 26 to a motor generator MG1. The motor generator MG1 generates electric power by receiving the power of the engine 26. The electric power (alternating current electric power) that is generated by the motor generator MG1 is supplied to the motor generator MG2 and is supplied to the battery pack 10 via the inverter 23. When the electric power that is generated by the motor generator MG1 is supplied to the motor generator MG2, the drive wheel 24 can be driven by the kinetic energy that is generated by the motor generator MG2. When the electric power that is generated by the motor generator MG1 is supplied to the battery pack 10, the battery pack 10 can be charged.

When the vehicle is decelerated or stopped, the motor generator MG2 converts kinetic energy that is generated during braking of the vehicle to electric energy (alternating current electric power). The inverter 23 converts the alternating current electric power that is generated by the motor generator MG2 to direct current electric power and outputs the direct current electric power to the battery pack 10. Then, the battery pack 10 can store regenerative electric power.

A direct current/direct current converter 27 is connected to the positive electrode line PL between the system main relay SMR-B and the inverter 23 and the negative electrode line NL between the system main relay SMR-G and the inverter 23. When the battery system is in the startup state, the direct current/direct current converter 27 steps down an output voltage of the battery pack 10 and outputs the electric power after the step-down to an auxiliary machine 28 and an auxiliary battery 29. The supply of the electric power from the battery pack 10 to the auxiliary machine 28 allows, for example, the engine 26 to be started.

In the battery system that is illustrated in FIG. 1, a booster circuit can be disposed on a current path between the battery pack 10 and the inverter 23. The booster circuit can boost the output voltage of the battery pack 10 and output the electric power after the boosting to the inverter 23. In addition, the booster circuit can step down an output voltage of the inverter 23 and output the electric power after the step-down to the battery pack 10.

Figure 2:
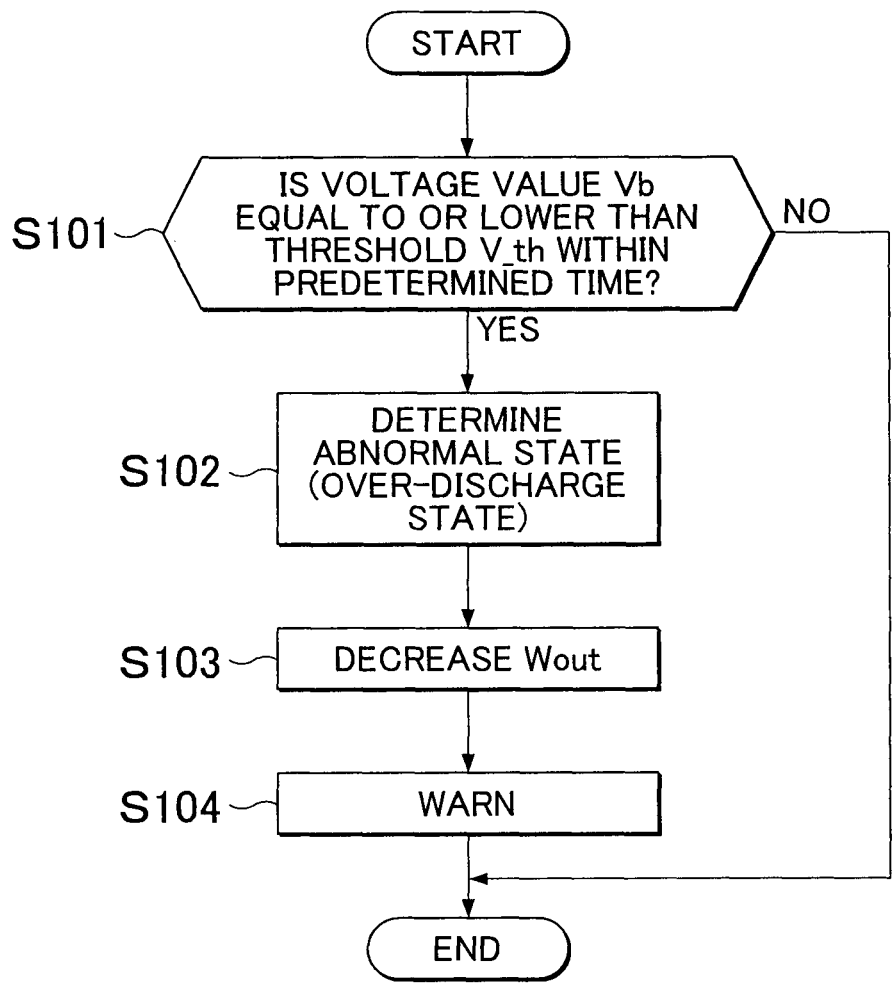
FIG. 2 is a flowchart showing a processing for determining an abnormal state (over-discharge state) of the battery system of the above-described embodiment.

A micro short circuit may occur in the single battery 11 (electric power generating element). When the micro short circuit occurs, the single battery 11 continues to be discharged and the single battery 11 is put into an abnormal state (over-discharge state). A processing for determining the abnormal state (over-discharge state) of the single battery 11 will be described with reference to the flowchart that is illustrated in FIG. 2. The processing that is illustrated in FIG. 2 is executed by the controller 30 when the battery system is in the startup state.

In Step S101, the controller 30 determines whether or not the voltage value Vb of the single battery 11 is equal to or lower than a voltage value threshold V_th within a predetermined time. The voltage value Vb is detected by the monitoring unit 20. Accordingly, the controller 30 can determine whether or not the voltage value Vb is equal to or lower than the voltage value threshold V_th within the predetermined time by monitoring the voltage value Vb. When variations of the voltage values Vb occur in the plurality of single batteries 11 that constitute the battery pack 10, the lowest voltage value Vb can be compared to the voltage value threshold V_th in the processing of Step S101.

The voltage value threshold V_th is the voltage value Vb for determining the over-discharge state of the single battery 11 and can be appropriately set. When the charging and discharging are performed on the battery pack 10 (single battery 11), the charging and discharging of the battery pack 10 is controlled so that the voltage value Vb changes within a range of an upper limit value to a lower limit value. The voltage value threshold V_th is a voltage value that is lower than the lower limit value. Information for specifying the voltage value threshold V_th is stored in the memory 31.

The voltage value Vb being equal to or lower than the voltage value threshold V_th within a predetermined time includes continuation of a state where the voltage value Vb is equal to or lower than the voltage value threshold V_th for a predetermined time and repetition of the state where the voltage value Vb is equal to or lower than the voltage value threshold V_th for a predetermined time. In the case of the latter, the voltage value Vb becomes higher than the voltage value threshold V_th or the voltage value Vb decreases to below the voltage value threshold V_th.

When the voltage value Vb decreases, the battery pack 10 is charged by electric power generation by the motor generator MG1 or the like. Accordingly, the voltage value Vb can be changed within the range of the upper limit value to the lower limit value as described above. When the micro short circuit occurs in the single battery 11, however, the voltage value Vb is likely to decrease and the voltage value Vb may become equal to or lower than the voltage value threshold V_th.

When the voltage value Vb does not exceed the voltage value threshold V_th within a predetermined time, the controller 30 terminates the processing that is illustrated in FIG. 2. In other words, the processing that is illustrated in FIG. 2 is terminated when the voltage value Vb does not exceed the voltage value threshold V_th for all of the single batteries 11.

When the voltage value Vb is equal to or lower than the voltage value threshold V_th within a predetermined time, the controller 30 performs the determination of the abnormal state (over-discharge state) in Step S102. The controller 30 determines that the single battery 11 which shows the voltage value Vb equal to or lower than the voltage value threshold V_th is in the abnormal state (over-discharge state). The determination of the abnormal state is performed when the voltage value Vb of at least one of the single batteries 11 is equal to or lower than the voltage value threshold V_th.

When the determination of the abnormal state is performed, the controller 30 can, for example, set a flag that shows the abnormal state (over-discharge state). Setting content of this flag is stored in the memory 31. The controller 30 can check whether or not the single battery 11 is in the abnormal state (over-discharge state) by checking the setting content of the flag that is stored in the memory 31.

In this embodiment, the abnormal state is not determined when the voltage value Vb is only temporarily equal to or lower than the voltage value threshold V_th. The abnormal state is determined when the state where the voltage value Vb is equal to or lower than the voltage value threshold V_th continues or is repeated as described above. Accordingly, reliability is ensured in determining the abnormal state. Still, the determination of the abnormal state (over-discharge state) can be performed when the voltage value Vb is temporarily equal to or lower than the voltage value threshold V_th.

After the determination of the abnormal state, the controller 30 decreases allowable output electric power Wout in Step S103. The allowable output electric power Wout is an upper limit electric power value that allows the battery pack 10 to be discharged. When the battery pack 10 is discharged, the allowable output electric power Wout is set and the discharging of the battery pack 10 is controlled so that output electric power of the battery pack 10 does not exceed the allowable output electric power Wout.

The allowable output electric power Wout is set based on the temperature Tb and a state of charge (SOC) of the battery pack 10. The SOC is a ratio of a charge capacity to a full-charge capacity. If a correspondence relationship between the temperature Tb and the allowable output electric power Wout is determined in advance, the allowable output electric power Wout corresponding to the temperature Tb can be specified by detecting the temperature Tb. If a correspondence relationship between the SOC and the allowable output electric power Wout is determined in advance, the allowable output electric power Wout corresponding to the SOC can be specified by calculating (estimating) the SOC. As is known, the SOC of the battery pack 10 can be estimated based on the current value Ib and the voltage value Vb of the battery pack 10.

During the control of the charging and discharging of the battery pack 10, not only the allowable output electric power Wout but also allowable input electric power Win are set. The allowable input electric power Win is an upper limit electric power value that allows the battery pack 10 to be charged. The allowable input electric power Win is set based on the temperature Tb and the SOC of the battery pack 10 as is the case with the allowable output electric power Wout. In this embodiment, the allowable output electric power Wout may be decreased so as to suppress over-discharge of the single battery 11.

In the processing of Step S103, the allowable output electric power Wout that is specified from the temperature Tb and the SOC is decreased. In other words, the allowable output electric power Wout that is set in the processing of Step S103 is lower than the allowable output electric power Wout that is specified from the temperature Tb and the SOC. The amount by which the allowable output electric power Wout is decreased can be appropriately set. For example, the amount by which the allowable output electric power Wout is decreased can be increased as a difference between the voltage value Vb and the voltage value threshold V_th increases when the voltage value Vb is equal to or lower than the voltage value threshold V_th. When the allowable output electric power Wout is decreased, it is preferable that the allowable output electric power Wout after the decrease is equal to or higher than electric power that is required for starting the engine 26. In this case, the engine 26 can be started by using the output electric power of the battery pack 10 even if the allowable output electric power Wout is decreased.

In Step S104, the controller 30 warns a user or the like by using a warning device that is mounted on the vehicle. Known means can be appropriately adopted as the warning device. For example, display on a display can be performed or a sound can be output so that the user is warned. Content of the warning may be any content that allows the user or the like to recognize that the battery pack 10 is in the abnormal state. The user or the like that receives the warning can allow the vehicle to travel to a safe place (evacuation traveling).

Figure 3:
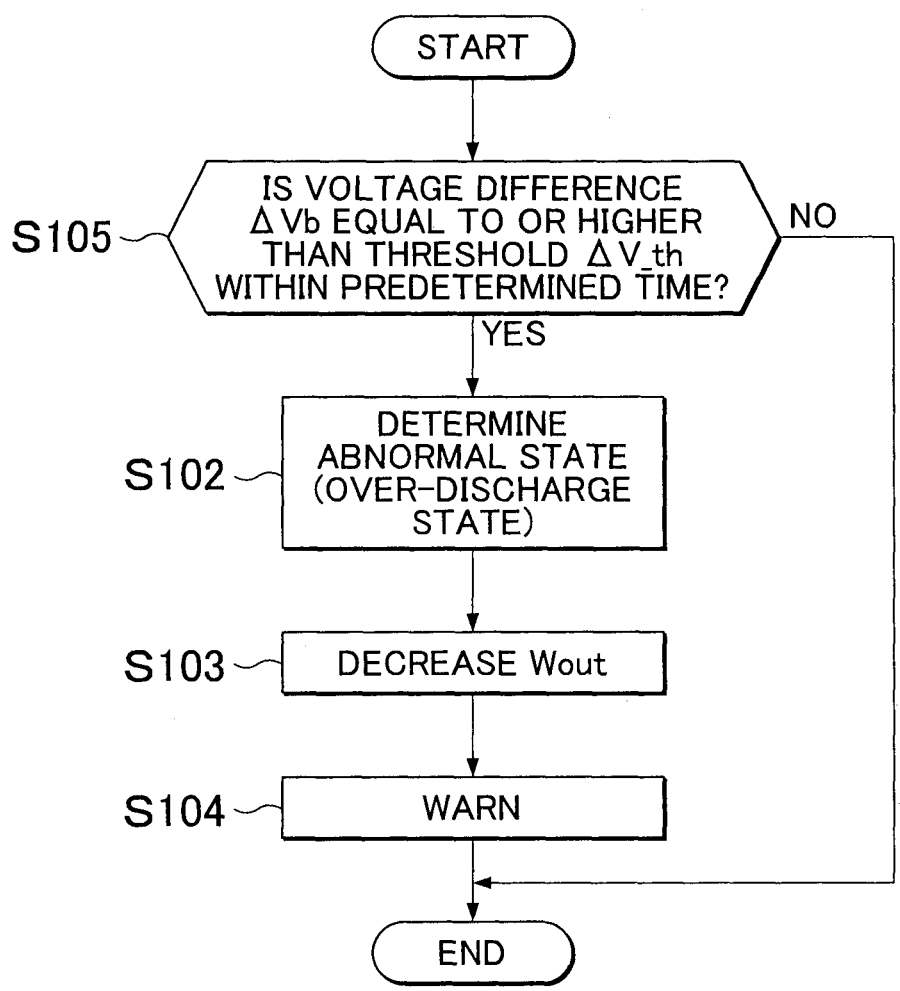
FIG. 3 is a flowchart showing a processing for determining an abnormal state (over-discharge state) of a battery system according to a modification example of the above-described embodiment.

The processing for determining the abnormal state (over-discharge state) of the single battery 11 is not limited to the processing that is illustrated in FIG. 2. For example, the processing that is illustrated in FIG. 3 can be performed instead of the processing that is illustrated in FIG. 2. Like reference numerals are used for the processing in FIG. 3 that is the same as the processing in FIG. 2 and description thereof will be omitted. In the processing that is illustrated in FIG. 3, a processing of Step S105 is performed instead of the processing of Step S101 that is illustrated in FIG. 2.

In Step S105, the controller 30 determines whether or not a voltage difference ΔVb is equal to or higher than a voltage difference threshold ΔV_th within a predetermined time. The voltage difference ΔVb is a difference between the voltage value Vb of each of the single batteries 11 and a reference voltage value Vref. The voltage value Vb is detected by the monitoring unit 20. A value that is obtained by averaging the voltage values Vb of all of the single batteries 11 can be used or the highest voltage value Vb can be used as an example of the reference voltage value Vref.

Although the voltage difference ΔVb can be calculated for each of the single batteries 11, the voltage difference ΔVb can also be obtained by specifying the lowest voltage value Vb and obtaining the difference between this voltage value Vb and the reference voltage value Vref. The voltage difference threshold ΔV_th is the voltage difference ΔVb for determining the over-discharge state of the single battery 11 and can be appropriately set. The single battery 11 is more likely to be discharged as the voltage difference ΔVb increases. When the voltage difference threshold ΔV_th is set based on this point, it can be determined whether or not the single battery 11 is in the over-discharge state. Information for specifying the voltage difference threshold ΔV_th is stored in the memory 31.

The voltage difference ΔVb being equal to or higher than the voltage difference threshold ΔV_th within a predetermined time includes continuation of a state where the voltage difference ΔVb is equal to or higher than the voltage difference threshold ΔV_th for a predetermined time and repetition of the state where the voltage difference ΔVb is equal to or higher than, the voltage difference threshold ΔV_th for a predetermined time. In the case of the latter, the voltage difference ΔVb becomes equal to or higher than the voltage difference threshold ΔV_th or the voltage difference ΔVb becomes lower than the voltage difference threshold ΔV_th.

When the voltage difference ΔVb is lower than the voltage difference threshold ΔV_th within a predetermined time, the processing that is illustrated in FIG. 3 is terminated. The processing of Steps S102 to S104 is performed when the voltage difference ΔVb is equal to or higher than the voltage difference threshold ΔV_th within a predetermined time.

In the processing that is illustrated in FIG. 3, the abnormal state is not determined, as is the case with the processing that is illustrated in FIG. 2, when the voltage difference ΔVb is only temporarily equal to or higher than the voltage difference threshold ΔV_th. In other words, the abnormal state is determined when the state where the voltage difference ΔVb is equal to or higher than the voltage difference threshold ΔV_th continues or is repeated. Accordingly, reliability is ensured in determining the abnormal state. Still, the abnormal state can be determined when the voltage difference ΔVb is temporarily equal to or higher than the voltage difference threshold ΔV_th.

The abnormal state (over-discharge state) can also be determined by combining the processing of Step S101 that is illustrated in FIG. 2 with the processing of Step S105 that is illustrated in FIG. 3. In other words, the abnormal state (over-discharge state) can be determined when the voltage value Vb is equal to or lower than the voltage value threshold V_th and the voltage difference ΔVb is equal to or higher than the voltage difference threshold ΔV_th within a predetermined time.

Figure 4:
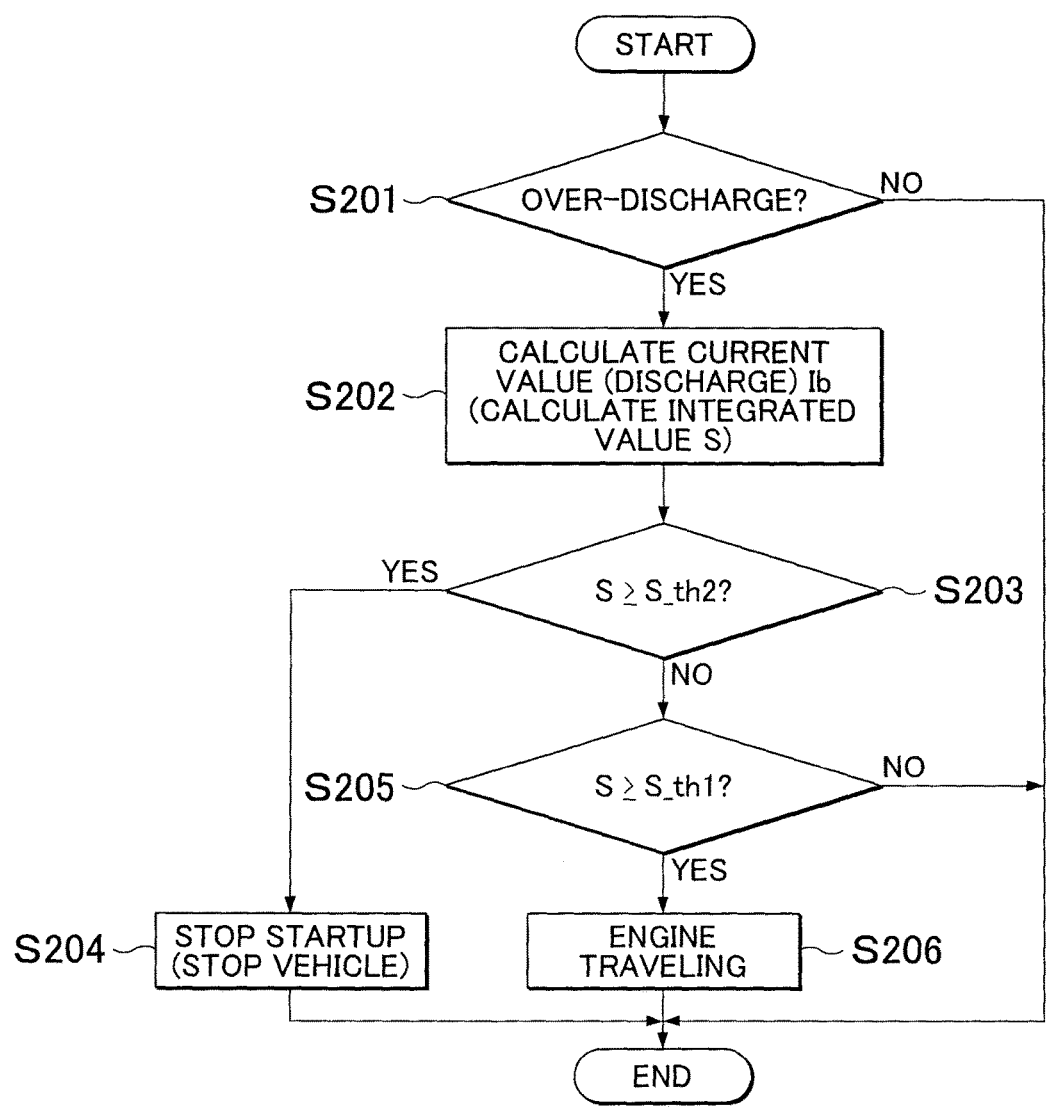
FIG. 4 is a flowchart showing a processing that is carried out after the determination of the abnormal state (over-discharge state) of the battery system according to the above-described embodiment.

The processing that is illustrated in FIG. 4 is performed after the determination of the abnormal state through the processing that is illustrated in FIGS. 2 and 3. The processing that is illustrated in FIG. 4 is executed by the controller 30. The controller 30 can initiate the processing that is illustrated in FIG. 4 after checking the setting of the flag which shows the abnormal state. The processing that is illustrated in FIG. 4 is repeated at a predetermined cycle.

In Step S201, the controller 30 determines whether or not at least one of the single batteries 11 included in the battery pack 10 is over-discharged. In other words, it is determined whether or not the single battery 11 is in the over-discharge state in the processing of Step S201.

The single battery 11 is determined to be over-discharged when, for example, the voltage value Vb of the single battery 11 is equal to or lower than the voltage value threshold V_th. This voltage difference threshold V_th is equal to the voltage difference threshold V_th described in the processing of Step S101 that is illustrated in FIG. 2. The single battery 11 can be determined to be over-discharged when the voltage difference ΔVb is equal to or higher than the voltage difference threshold ΔV_th. The voltage difference ΔVb and the voltage difference threshold ΔV_th are identical to the voltage difference ΔVb and the voltage difference threshold ΔV_th described in the processing of Step S105 that is illustrated in FIG. 3.

The controller 30 terminates the processing that is illustrated in FIG. 4 if the single battery 11 is not over-discharged, that is, in the case of NO in Step S201 that is illustrated in FIG. 4. If the single battery 11 is over-discharged, the controller 30 integrates the current value Ib during the discharging of the battery pack 10 and calculates an integrated value S in Step S202. The integration of the current value (discharge current) Ib is performed every time the single battery 11 is over-discharged, and the integrated value S continues to increase. If the single battery 11 is not over-discharged, the integration of the current value (discharge current) Ib is not performed even if the single battery 11 is discharged.

In Step S203, the controller 30 determines whether or not the integrated value S that is calculated in the processing of Step S202 is equal to or higher than a second threshold S_th2. The second threshold S_th2 is a value (integrated value S) for determining whether or not the vehicle is required to be stopped. As described later, the second threshold S_th2 is set in view of the remaining amount of the electrolytic solution contained in the single battery 11. Information for specifying the second threshold S_th2 is stored in the memory 31.

When the integrated value S is equal to or higher than the second threshold S_th2, the controller 30 stops startup of the battery system in Step S204. Specifically, the controller 30 switches the system main relays SMR-B, SMR-G from ON to OFF. In this case, the engine 26 is stopped when the engine 26 is already started. The vehicle is stopped in this manner.

When the integrated value S is lower than the second threshold S_th2, the controller 30 determines whether or not the integrated value S calculated in the processing of Step S202 is equal to or higher than a first threshold S_th1 in Step S205. The first threshold S_th1 is a value that is lower than the second threshold S_th2. The first threshold S_th1 is a value (integrated value S) for determining whether or not to allow the vehicle to travel by using only the power of the engine 26. As described later, the first threshold S_th1 is set in view of the remaining amount of the electrolytic solution contained in the single battery 11. Information for specifying the first threshold S_th1 is stored in the memory 31.

When the integrated value S is equal to or higher than the first threshold S_th1, the controller 30 allows the vehicle to travel by using only the power of the engine 26 in Step S206. In the processing of Step S206, the battery system is in the startup state but traveling by using power of the motor generator MG2 is not performed. When the integrated value S is lower than the first threshold S_th1, the controller 30 terminates the processing that is illustrated in FIG. 4. The allowable output electric power Wout remains decreased, through the processing of Step S103 that is illustrated in FIG. 2 or 3, while the integrated value S is lower than the first threshold S_th1.

When the determination of the abnormal state (over-discharge state) is performed, the electrolytic solution remains in the single battery 11 (battery case) in the over-discharge state. Specifically, the electrolytic solution remains in the separator of the electric power generating element or the electrolytic solution (surplus liquid) remains around the electric power generating element. If the single battery 11 in the over-discharge state is discharged after the determination of the abnormal state is performed, the electrolytic solution is decomposed. Specifically, moisture that is contained in the electrolytic solution is decomposed so as to discharge the single battery 11, and the amount of the electrolytic solution decreases. The gas is generated as a result of the decomposition of the electrolytic solution.

Figure 5:
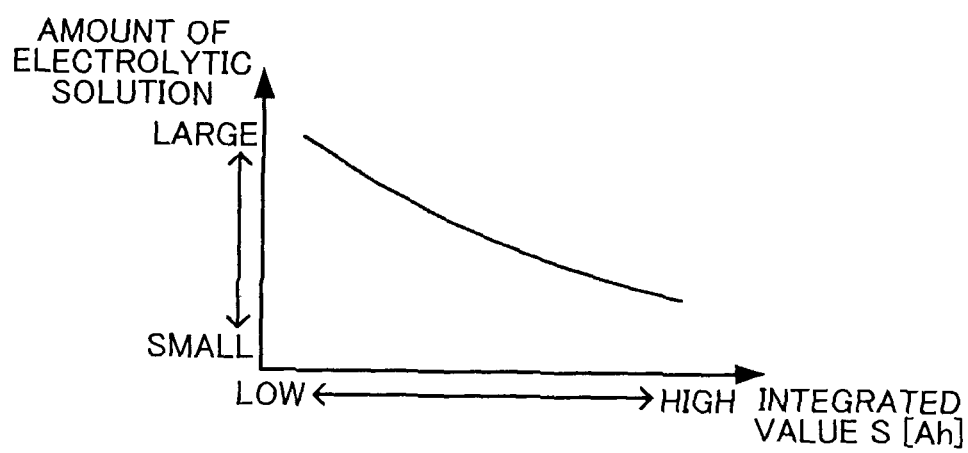
FIG. 5 is a diagram illustrating a relationship between the amount of an electrolytic solution and an integrated value in the battery system according to the above-described embodiment.

A decrement of the electrolytic solution depends on the current value Ib during the discharging of the single battery 11 in the over-discharge state. In other words, the decrement of the electrolytic solution increases as the current value (discharge current) Ib increases and the integrated value S of the current value (discharge current) Ib increases. Accordingly, the amount of the electrolytic solution decreases as the integrated value S increases as illustrated in FIG. 5. The single battery 11 cannot be discharged in the absence of the electrolytic solution. In other words, the single battery 11 can be discharged before the electrolytic solution disappears.

In this embodiment, the remaining amount of the electrolytic solution (in other words, the decrement of the electrolytic solution) is grasped by calculating the integrated value S. Then, the single battery 11 in the over-discharge state is discharged while the integrated value S is monitored and the remaining amount of the electrolytic solution is grasped. In this manner, the battery pack 10 (including the single battery 11 in the over-discharge state) can be discharged even after the determination of the abnormal state (over-discharge state) is performed.

If discharge electric power of the battery pack 10 is supplied to the motor generator MG2, the vehicle can be allowed to travel by using the power of the motor generator MG2. In addition, the engine 26 can be driven by discharging the battery pack 10 and the vehicle can be allowed to travel by using the power of the engine 26. Compared to a case where the vehicle is stopped when the abnormal state is determined, a traveling distance that is available when the evacuation traveling of the vehicle is performed can be increased since the traveling of the vehicle continues even after the determination of the abnormal state.

When the determination of the abnormal state is performed, the amount of the electrolytic solution in the single battery 11 rarely decreases in most cases. In this case, a gas that is generated as a result of evaporation of the electrolytic solution may be moved out of the single battery 11 through the battery case of the single battery 11. Then, the amount of the electrolytic solution may decrease. However, the decrement of the electrolytic solution is slight in this case. Accordingly, the amount of the electrolytic solution that is available when the abnormal state is determined is almost equal to the amount of the electrolytic solution that is injected into the battery case when the single battery 11 is manufactured.

If the amount of the electrolytic solution that is available when the abnormal state is determined can be grasped, the integrated value S until the disappearance of the electrolytic solution can be grasped. If a relationship between the current value Ib that is available when the single battery 11 in the over-discharge state is discharged and the decrement of the electrolytic solution is obtained in advance in an experiment or the like, the integrated value S until the disappearance of the electrolytic solution can be calculated. The second threshold S_th2 can be a value that is lower than the integrated value S obtained when the electrolytic solution disappears. The first threshold S_th1 can be a value that is lower than the second threshold S_th2.

Figure 6:
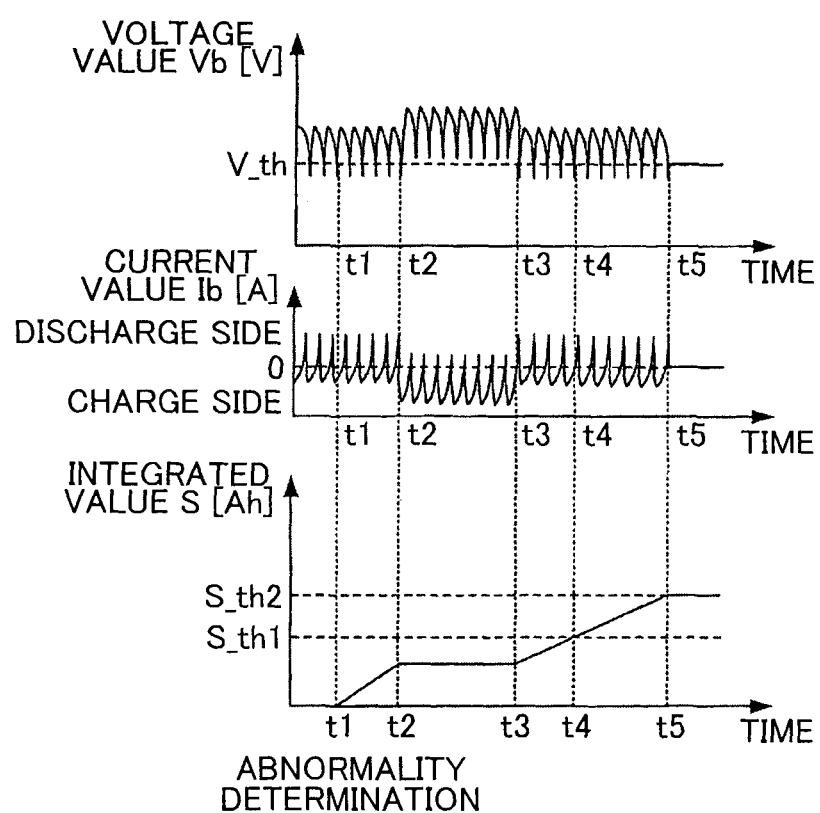
FIG. 6 is a diagram illustrating an example of behaviors of a voltage value, a current value, and the integrated value in the battery system according to the above-described embodiment.

FIG. 6 is a diagram (example) illustrating how the voltage value Vb, the current value Ib, and the integrated value S are changed when the processing that is illustrated in FIG. 4 is performed. The vertical axes in FIG. 6 illustrate the voltage value Vb, the current value Ib, and the integrated value S, respectively. The horizontal axis in FIG. 6 represents time. In the example that is illustrated in FIG. 6, it is determined whether or not the single battery 11 is in the over-discharge by determining whether or not the voltage value Vb is equal to or lower than the voltage value threshold V_th.

In the example that is illustrated in FIG. 6, the determination of the abnormal state (over-discharge state) is performed at time t1. Accordingly, the allowable output electric power Wout is decreased after time t1. The current value Ib that is available when the battery pack 10 is discharged can be decreased by decreasing the allowable output electric power Wout. If the current value (discharge current) Ib is decreased, the decrement of the electrolytic solution can be suppressed in the single battery 11 in the over-discharge state. In other words, the decrement of the electrolytic solution per unit time can be decreased and the length of time during which the single battery 11 in the over-discharge state can be discharged can be increased. The allowable output electric power Wout may not be decreased after the determination of the abnormal state. In other words, the processing of Step S103 in FIG. 2 or 3 can be omitted.

After time t1, the processing that is illustrated in FIG. 4 is performed and the single battery 11 in the over-discharge state is discharged while the electrolytic solution is decomposed. Then, the current value (discharge current) Ib is integrated every time the single battery 11 is over-discharged, and the integrated value S increases. From time t1 to time t2, the voltage value Vb is equal to or lower than the voltage value threshold V_th, and thus the integrated value S increases.

According to FIG. 6, the integrated value S increases linearly. Actually, however, the integrated value S increases by the same amount as the current value (discharge current) Ib that is available when the single battery 11 is over-discharged. In addition, the gas is generated as a result of the decomposition of the electrolytic solution, and thus the valve that is disposed in the single battery 11 (battery case) may be changed from the closed state to the open state.

After time t2, the current value Ib is shifted to a charge side and the voltage value Vb becomes higher than the voltage value threshold V_th. In this case, the single battery 11 is not over-discharged and the amount of the electrolytic solution does not decrease even if the single battery 11 is discharged. Accordingly, the integration of the current value (discharge current) Ib is not performed and the integrated value S does not increase after time t2.

At time t3, the current value Ib is shifted to a discharge side and the voltage value Vb becomes equal to or lower than the voltage value threshold V_th. In this case, the single battery 11 is over-discharged and the amount of the electrolytic solution decreases as a result of the discharge of the single battery 11. The integration of the current value (discharge current) Ib is resumed and the integrated value S increases. At time t4, the integrated value S reaches the first threshold S_th1. In this manner, switching is carried out to the traveling using only the power of the engine 26. In other words, the vehicle can be allowed to travel by using not only the power of the engine 26 but also the power of the motor generator MG2 until time t4.

After time t4, the traveling using the power of the motor generator MG2 is not performed. However, the battery pack 10 is discharged by an operation of the auxiliary machine 28 (driving of the engine 26) or the like. Accordingly, the voltage value Vb may be equal to or lower than the voltage value threshold V_th even after time t4. Since the voltage value Vb is equal to or lower than the voltage value threshold V_th even after time t4, the integration of the current value (discharge current) Ib is performed and the integrated value S increases. After, the integrated value S continues to increase and the integrated value S reaches the second threshold S_th2 at time t5, the startup of the battery system is stopped. Then, the vehicle is stopped.

According to this embodiment, the vehicle can be allowed to continue traveling from time t1 to time t5 even after the determination of the abnormal state (over-discharge state). Accordingly, the traveling distance that is available when the evacuation traveling is performed can be increased compared to a case where the vehicle is stopped at time t1.

The hybrid car has been used in the description of this embodiment but the invention is not limited thereto. In other words, the invention can be applied to so-called electric cars. The electric car refers to a vehicle in which the battery pack 10 is provided as the only power source for vehicle traveling. In the electric car, a motor generator that receives the discharge electric power of the battery pack 10 generates power for vehicle traveling.

In the electric car, the battery pack 10 (single battery 11 in the over-discharge state) can be discharged while the amount of the electrolytic solution is decreased even after the determination of the abnormal state (over-discharge state) as in this embodiment. In this manner, the electric car can be allowed to continue traveling, by using the power of the motor generator, even after the determination of the abnormal state (over-discharge state). Accordingly, a traveling distance that is available when evacuation traveling is performed can be increased as in this embodiment.

The invention claimed is:

1. A vehicle comprising:
a battery pack in which a plurality of alkaline secondary batteries are connected in series;
a motor configured to generate power for traveling of the vehicle by receiving discharge electric power of the battery pack;
a voltage sensor configured to detect a voltage value of each of the alkaline secondary batteries;
a current sensor configured to detect a current value of the battery pack;
an engine configured to generate power for the traveling of the vehicle; and
a controller configured to:
(i) determine whether or not the alkaline secondary battery is in an over-discharge state based on at least the voltage value or a voltage difference, the voltage difference being a difference between the voltage value and a predetermined reference voltage value, and
(ii) perform the traveling of the vehicle by using the power of the motor by discharging the battery pack while decomposing electrolytic solution contained in the alkaline secondary battery in the over-discharge state after the controller determines that the alkaline secondary battery is in the over-discharge state,
wherein the controller is configured to decrease an upper limit electric power value while an integrated value is lower than a first threshold when the controller determines that the alkaline secondary battery is in the over-discharge state, the upper limit electric power value allowing the discharging of the battery pack, and the integrated value being obtained by integrating the current value while performing the discharging for decomposing the electrolytic solution, and
the controller is configured to perform the traveling of the vehicle by using the power of the engine, without using the power of the motor, when the integrated value is equal to or higher than the first threshold.

2. The vehicle according to claim 1,
wherein the controller is configured to stop charging and the discharging of the battery pack and the controller is configured to stop the engine, when the integrated value is equal to or higher than a second threshold higher than the first threshold.

3. The vehicle according to claim 1, wherein
the engine is configured to start by receiving the discharge electric power of the battery pack, the engine is configured to generate the power for the traveling of the vehicle, and
the controller decreases the upper limit electric power value within a range equal to or higher than electric power for starting the engine when the integrated value is lower than the first threshold.

* * * * *